United States Patent
Jibbe et al.

(10) Patent No.: US 8,843,808 B2
(45) Date of Patent: Sep. 23, 2014

(54) SYSTEM AND METHOD TO FLAG A SOURCE OF DATA CORRUPTION IN A STORAGE SUBSYSTEM USING PERSISTENT SOURCE IDENTIFIER BITS

(75) Inventors: Mahmoud K. Jibbe, Wichita, KS (US); Arunkumar Ragendran, Bangalore (IN); Britto Rossario, Bangalore (IN); Senthil Kannan, Pondicherry (IN); Padmanabhan Pandurangan, Krishnagiri (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 572 days.

(21) Appl. No.: 13/173,184

(22) Filed: Jun. 30, 2011

(65) Prior Publication Data

US 2013/0007531 A1    Jan. 3, 2013

(51) Int. Cl.
    *G06F 11/00*       (2006.01)
    *G06F 11/07*       (2006.01)
    *G06F 11/10*       (2006.01)

(52) U.S. Cl.
    CPC .... *G06F 11/0727* (2013.01); *G06F 2211/1088* (2013.01); *G06F 11/1004* (2013.01); *G06F 11/0772* (2013.01)
    USPC ......................................... 714/776; 714/770

(58) Field of Classification Search
    USPC ..................... 714/763, 764, 765, 770, 776
    See application file for complete search history.

(56) References Cited

U.S. PATENT DOCUMENTS

| | | | | |
|---|---|---|---|---|
| 5,884,067 A * | 3/1999 | Storm et al. | .................. | 345/533 |
| 6,567,364 B1 * | 5/2003 | Takahashi et al. | .............. | 369/95 |
| 7,120,559 B1 | 10/2006 | Williams et al. | ............... | 702/185 |
| 7,200,525 B1 | 4/2007 | Williams et al. | ............... | 702/185 |
| 7,231,550 B1 | 6/2007 | McGuire et al. | ................. | 714/26 |
| 7,852,867 B2 * | 12/2010 | Tsang et al. | .................... | 370/428 |
| 7,873,895 B2 | 1/2011 | Tayler | ............................ | 714/763 |
| 7,916,641 B2 | 3/2011 | Bourlas et al. | ................. | 370/235 |
| 2003/0037280 A1 | 2/2003 | Berg et al. | .......................... | 714/6 |
| 2003/0135794 A1 | 7/2003 | Longwell et al. | ............... | 714/42 |
| 2007/0186135 A1 | 8/2007 | Flachs et al. | ..................... | 714/752 |
| 2007/0283193 A1 | 12/2007 | Lewis et al. | ...................... | 714/48 |
| 2009/0055718 A1 | 2/2009 | Nagaraj | ......................... | 714/807 |
| 2009/0199064 A1 | 8/2009 | Radha et al. | .................... | 714/752 |
| 2010/0050049 A1 | 2/2010 | Lin et al. | ......................... | 714/758 |
| 2010/0070830 A1 | 3/2010 | Ngo | ................................ | 714/763 |
| 2010/0111168 A1 | 5/2010 | Villion et al. | ............. | 375/240.12 |
| 2010/0293437 A1 | 11/2010 | Gollub et al. | .................. | 714/763 |
| 2011/0066925 A1 | 3/2011 | Smith | ............................ | 714/805 |

OTHER PUBLICATIONS

Hassner, M.; Schwiegelshohn, U.; Winograd, Shmuel, "On-the-fly error correction in data storage channels," Magnetics, IEEE Transactions on , vol. 31, No. 2, pp. 1149,1154, Mar. 1995.*

Jeppesen, J.; Allen, W.; Anderson, S.; Pilsl, M., "Hard disk controller: the disk drive's brain and body," Computer Design, 2001. ICCD 2001. Proceedings. 2001 International Conference on , vol., No., pp. 262,267, 2001.*

* cited by examiner

*Primary Examiner* — Cynthia Britt
(74) *Attorney, Agent, or Firm* — Christopher P. Maiorana, PC

(57) ABSTRACT

An apparatus comprising an array controller and a frame buffer. The array controller may be configured to read/write data to/from a drive array in response to one or more input/output requests. The frame buffer may be implemented within the array controller and may be configured to perform (i) a first data integrity check to determine a first type of data error and (ii) a second data integrity check to determine a second type of data error. The frame buffer may log occurrences of the first type of error and the second type of error in a field transmitted with the data. The field may be used to determine a source of possible corruption of the data.

16 Claims, 3 Drawing Sheets

SYSTEM AND METHOD TO FLAG A SOURCE OF DATA CORRUPTION IN A STORAGE SUBSYSTEM USING PERSISTENT SOURCE IDENTIFIER BITS

FIELD OF THE INVENTION

The present invention relates to storage devices generally and, more particularly, to a method and/or apparatus to flag a source of data corruption in a storage subsystem using persistent source identifier bits.

BACKGROUND OF THE INVENTION

Data corruption occurs when data stored on a block of data on a disk is incorrect. Data corruption is a high risk and very high priority issue for any customer. Management of data corruption is a critical issue. Data corruption can include bit corruption (bit flip while data at store or in-flight), lost writes, misdirected writes, and torn/truncated writes. There are many conventional approaches to detection of data corruption depending on the layer where the data is managed.

A conventional host application layer has built-in mechanisms to detect data corruption or data integrity errors using multiple approaches (i.e., a data integrity field (DIF)). The interface protocol also defines multiple approaches to preserve data integrity or to detect data errors during data transmissions between host and target entities through protocol rules.

When data is transmitted from a host to a target controller, and a response is delivered to the host, the data is held within the controller and traverses through multiple hierarchical elements until the data is committed to the disk. The underlying hardware entities that store and forward the data, or the underlying firmware that manages the data in transit, are transparent to the higher layers. Any data integrity issue of the data in transit would need to be detected or managed within, since any corruption of data goes unnoticed even as the compromised data is written to the disk. Though the upper layer would detect a data corruption during subsequent reads using corresponding tagged DIF elements to the user data, such a system is highly complicated to analyze the exact source of the low level corruption that compromised the data in transit. At best, such detection involves complex sequence of steps in a controlled environment to eliminate the data corruption cause.

It would be desirable to implement a system to flag/detect the source of data corruption, and/or to preserve the indicators to assist during field analysis. It would also be desirable to implement a system and/or method to flag source of data corruption in storage subsystem using persistent source identifier bits.

SUMMARY OF THE INVENTION

An apparatus comprising an array controller and a frame buffer. The array controller may be configured to read/write data to/from a drive array in response to one or more input/output requests. The frame buffer may be implemented within the array controller and may be configured to perform (i) a first data integrity check to determine a first type of data error and (ii) a second data integrity check to determine a second type of data error. The frame buffer may log occurrences of the first type of error and the second type of error in a field transmitted with the data. The field may be used to determine a source of possible corruption of the data.

The objects, features and advantages of the present invention include providing a detection system in a data storage environment that may (i) provide a boundary and/or structural check technique to verify whether protocol delivered data has been corrupted while the data is held in a host interface buffer of a target controller, (ii) provide asynchronous notification to the host layer if the data held in the buffers is compromised, (iii) provide unique stage wise Cyclic Redundancy Check (CRC) based checksum wrapped to the transaction data as the data navigates through one or more entities behind the array controller, (iv) provide progressive CRC checksum mechanism where the CRC of the predecessor entity is decoded and/or checked by a successive entity and/or is replaced with a present entity specific CRC, (v) provide Source Identifier (SID) fields defined to flag the source of data corruption during the process of data commit to one or more disks, (vi) provide a persistent index table containing SID fields in a non-volatile storage for subsequent field analysis, (vii) provide a bit identifier within an SID field to detect the flow integrity of the I/O transaction, (viii) provide an option to perform a quick scrub of a persistent SID field to identify corrupted locations in one or more disks, (ix) provide inherent interpretation of possible SID fields to isolate different causes of data corruption, (x) provide an option to discard a persistent SID field entry if previously stored corrupted data is corrected using a correction process, (xi) be helpful in flagging the source of data corruption as the data traverses through the array and/or as data corruption is detected, (xii) present schemes to detect data bit errors at the sources of corruption, (xiii) detect multiple errors caused by a particular entity to provide preventive and/or corrective action, (xiv) enable multilevel, faster lookup or data scrub of data, (xv) reduce the cycle time needed for data corruption analysis in production, test and/or debug environments, (xvi) be implemented without setting the SID bits so the controller firmware may detect a data error in a given logical block address (LBA) (e.g., silent corruption has occurred and the stored data has errors), (xvii) implement an SID mechanism as an error injection mechanism during the validation of storage array hardware or firmware, and/or (xviii) set SID bits to mark different entities as an error injection source and/or detect if an error handling flow is functionally correct.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may provide a system and/or method to detect in-flight data corruption. The system may flag the source as data from a host traverses within an array controller through one or more hierarchical entities enroute to a disk. The source of data corruption may be flagged using bit field stored in an index table. A boundary marker and/or asynchronous notification may be defined where a data scrub may be performed in addition to other protocol defined data integrity techniques. A faster and multi-level data scrub of data during a store operation may be defined and/or assisted by a persisted bit field. The system may provide an isolation mechanism between different classes of data corruption (e.g., between in-flight and/or in-store data corruption, etc.).

Figure 1:
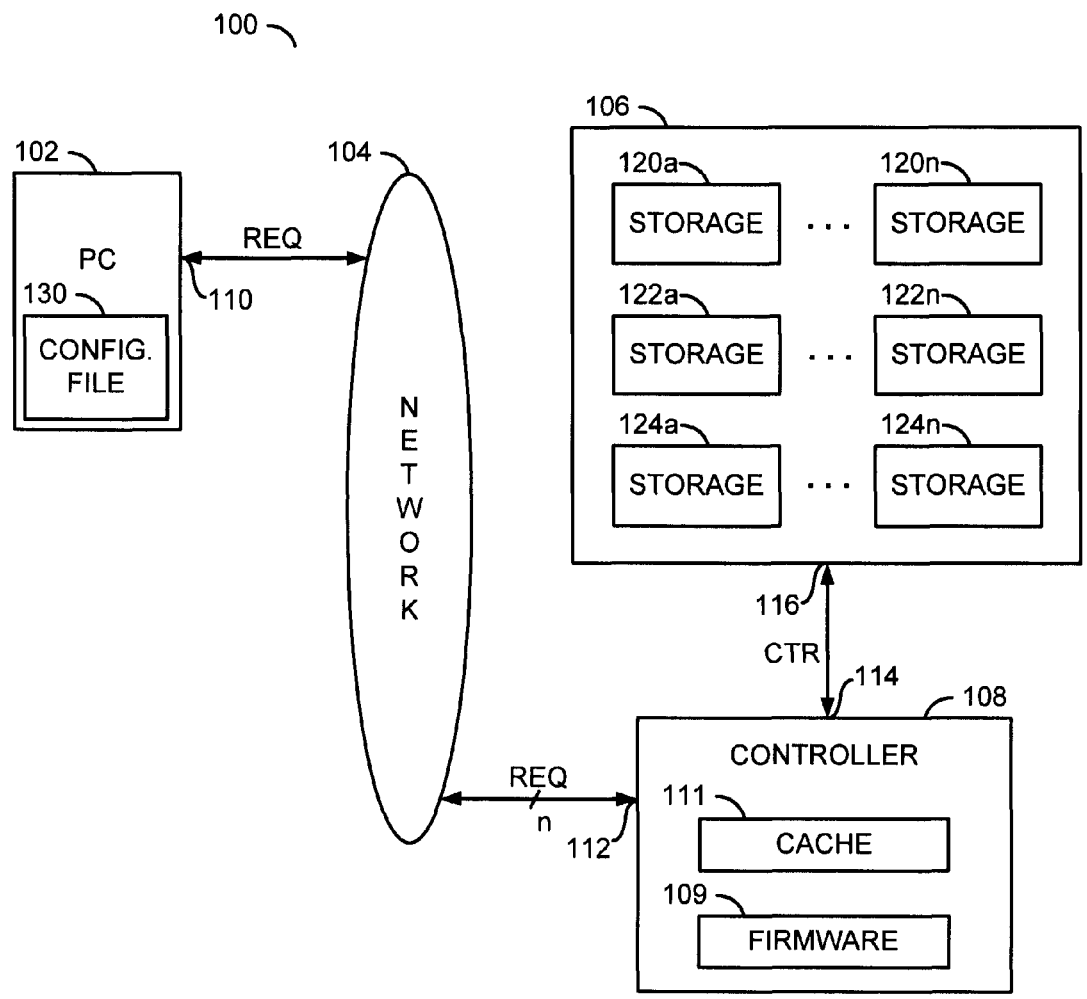
FIG. 1 is a block diagram of a data storage system.

Referring to FIG. 1, a block diagram of a system 100 is shown illustrating a context of the present invention. The system 100 generally comprises a block (or circuit) 102, a network 104, a block (or circuit) 106 and a block (or circuit) 108. The circuits 102 to 108 may represent modules and/or blocks that may be implemented as hardware, software, a combination of hardware and software, or other implementations.

The circuit 102 may be implemented as a host. The host 102 may be implemented as one or more computers (or servers or processors) in a host/client configuration. The circuit 106 may be implemented as a number of storage devices (e.g., a drive array). The circuit 108 may be implemented as a controller (e.g., an array controller). In one example, the circuit 108 may be a redundant array of independent disks (or drives) (e.g., RAID) controller. The circuit 108 may include a block (or module, or circuit) 109 and a block (or module, or circuit) 111. The block 109 may be implemented as firmware (or software or program instructions or code) that may control the controller 108. The block 111 may be implemented as a cache. The cache 111 may contain a logical block address (LBA) identifier of the data to be written to the array 106.

The host 102 may have an input/output 110 that may present a signal (e.g., REQ). A configuration file 130 may be sent via the signal REQ through the network 104 to an input/output 112 of the controller 108. The controller 108 may have an input/output 114 that may present a signal (e.g., CTR) to an input/output 116 of the storage array 106.

The array 106 may have a number of storage devices (e.g., drives or volumes) 120a-120n, a number of storage devices (e.g., drives or volumes) 122a-122n and a number of storage devices (e.g., drives or volumes) 124a-124n. In one example, each of the storage devices 120a-120n, 122a-122n, and 124a-124n may be implemented as a single drive, multiple drives, and/or one or more drive enclosures. The storage devices 120a-120n, 122a-122n and/or 124a-124n may be implemented as one or more hard disc drives (e.g., HDDs), one or more solid state devices (e.g., SSDs) or a combination of HDDs and/or SSDs.

Figure 2:
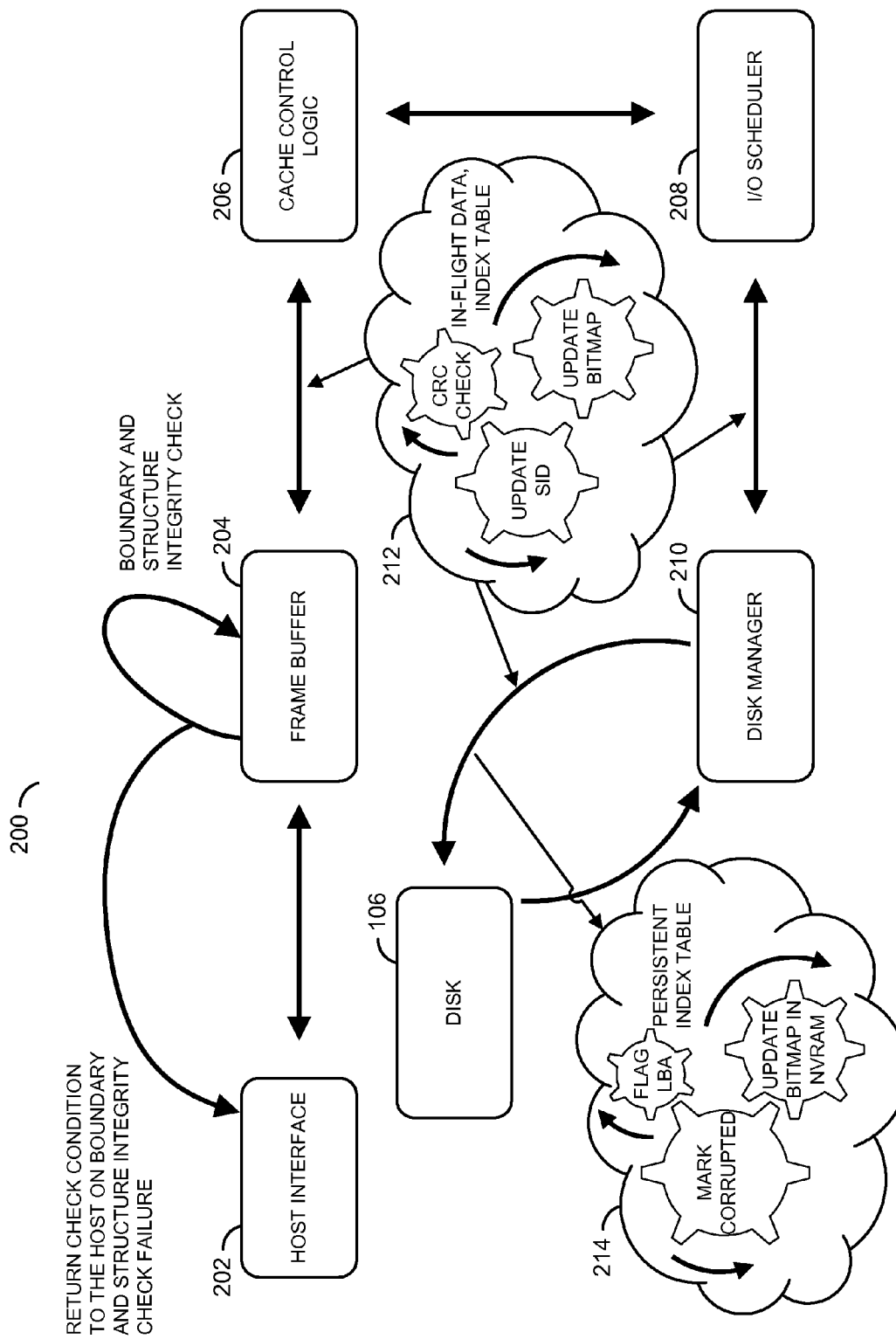
FIG. 2 is a diagram illustrating a hierarchical overview of the system.

Referring to FIG. 2, a block diagram of a system 200 is shown in accordance with an embodiment of the present invention. A hierarchical view of the different entities that are traversed through by the user data is shown. The system 200 represents portions within the controller 108. The system 200 generally comprises a block (or circuit) 202, a block (or circuit) 204, a block (or circuit) 206, a block (or circuit) 210, a block (or circuit) 212, a block (or circuit) 214, and the array 106. The block 202 may be implemented as a host interface. The block 204 may be implemented as a frame buffer. The block 206 may be implemented as a cache control logic. The block 208 may be implemented as an I/O scheduler. The block 210 may be implemented as a disk manager. The block 212 may represent logical flows within the firmware 109. The block 214 may represent logical flows within the firmware 109. The block 212 and the block 214 will be described in more detail in connection with FIG. 3.

The system 200 may enable detection and/or flagging of data integrity errors of in-flight data that is held within the array controller 108. The detection may occur as data travels to the storage array 106 where the data may be written and/or stored. The data integrity check may occur between the array controller 108 and the hierarchical sub-elements that are beneath the array controller 108. The system 200 may implement an integrity check point for the I/O data as the data traverses through the system 200.

The system 200 may implement a boundary check followed by a progressive CRC flow analysis. The boundary check and/or the flow analysis may be considered a first and/or a second data integrity check. In the array controller 108, as the host 102 delivers data over the protocol interface 202 in form of frame data received in response to an I/O request, the data is unpacked and checked for data integrity according to protocol rules. A good (e.g., successfully written data) or bad (e.g., corrupted data) response is delivered for each frame of data. Once all the frames are transmitted for a particular I/O transaction, the data may be held in the frame buffer 204. While the data is being held in the frame buffer 204, a structural integrity check of the frame buffer 204 may be performed. If an error is encountered, an asynchronous response may be delivered to the host 102 to re-transmit the data. The particular model of the structural integrity may be varied to meet the design criteria of a particular implementation. The structural integrity may be analyzed when the host 102 performs a subsequent read of the same data at later stage.

The term boundary check may be used to describe a process that occurs once the I/O transaction is allocated into the cache 111. Without the system 100, data is not normally marked as a bad I/O response. The host 102 is not normally notified of any further inadvertent changes to the data without the system 100. The system 100 may analyze the crossover of data at the boundary. After the boundary check, the data may traverse through the subsequent entities after bing removed from the cache 111. The data may be moved to the subsequent entities within the array controller 108 enroute to the array 106. The data may append a CRC based checksum value to the I/O data.

An SID entry may be created in an index table in the system memory for the in-flight I/O requests. An in-flight I/O request may carry data for a specific LBA or a range of LBAs. An example of the SID field is shown in the following TABLE 1:

TABLE 1

| MSB | 0 | 1 | ... |   | n |
|-----|---|---|-----|---|---|
| X   | 0 | 0 |     | 0 | 0 |

As the data is being delivered to the subsequent entity, the I/O data is checksum verified by applying a decoding logic. Every entity of the system 100 is generally aware of the encoding logic applied to the I/O data by the preceding entity.

If a data error is detected, a lookup of the entry created for the I/O request may be performed on the bitmap. The bit relevant to the preceding entity in the SID field may be set to "1". If no data error is detected, the bit relevant to the preceding entity in the SID field may be set to "0". If the I/O data is compromised and/or corrupted, the last known source from where the faulty entitled from where the faulty data propagated may be identified using the bit set to "1". At any point when the data corruption is detected and flagged, the data may be stripped of the preceding CRC checksum. Such data may be forwarded to the subsequent entities without any checksum appended to save on any overhead. If there is not any data corruption detected, the previous CRC checksum may be stripped. The data is now appended with a newer CRC checksum by the present entity and may be forwarded to the next entity.

At a final step, two possible conditions may occur. As the I/O is being committed to the physical media, a particular I/O entry (range of LBAs) is looked up through the bit map. If there is no SID field bit set, the entry from the bit map is evicted and the data is committed to the disk.

Figure 3:
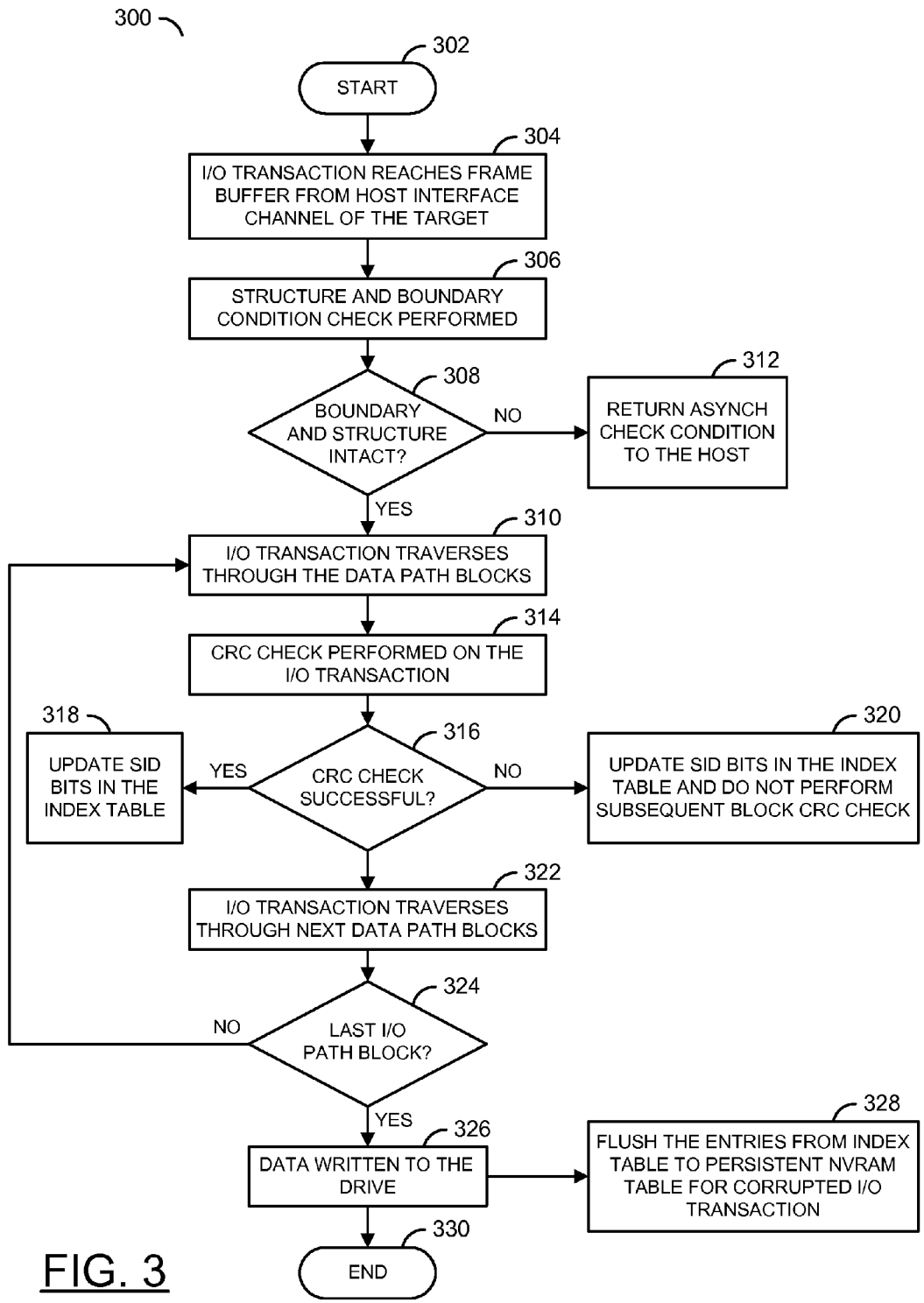
FIG. 3 is a flow diagram of the present invention.

Referring to FIG. 3, a flow diagram of a process for implementing the data integrity check of the present invention is shown. The method 300 generally comprises a step (or state) 302, a step (or state) 304, a step (or state) 306, a decision step (or state) 308, a step (or state) 310, a step (or state) 312, a step (or state) 314, a decision step (or state) 316, a step (or state) 318, a step (or state) 320, a step (or state) 322, a decision step (or state) 324, a step (or state) 328, a step (or state) 330. The step 302 starts the method 300. The step 304 may determine if an I/O transaction reaches the frame buffer 204 from the host interface channel 202 of the target. Next, the step 306 may implement a structure and/or boundary condition check. Next, the decision step 308 determines if a boundary and/or structure of the data are in tact. If not, the method 300 moves to the step 312. The step 312 returns a CRC check condition to the host 102. Next, the step 310 determines if an I/O transaction traverses through the data path blocks. Next, the step 314 performs a CRC check on the I/O transaction. Next, the decision step 316 determines if the CRC check is successful. If so, the step 318 updates the SID bits in the index table. If not, the step 320 updates the SID bits on the index table, but a subsequent block CRC check is not performed. Next, the step 322 determines if the I/O transaction traverses through the next data path blocks. Next, the decision state 324 determines whether the last I/O path block has been analyzed. Next, the step 326 writes data to the drive 106. Next, the step 328 flushes the entries from the index table to a persistent memory table as a log of the corrupted I/O transactions. Next, the step 330 ends the method. In general, the method 300 may be implemented on each I/O request and subsequent I/O transaction. By implementing the method 300 on each I/O transaction, a log of potential corruption of each piece of data written to the array 106 may be maintained.

If the particular I/O entry of any of the SID bit is set to "1", the data compromised is still written to the array 106. However the index table entry is preserved to contain the I/O range. The SID field may be flagged as an error for future analysis.

The SID field may include a number of bits (or fields). Source identifier field may be "n"+1 bits long binary field, where n is the number of logical entities where the CRC based checksum is appended/verified. The SID field is generally paired with the I/O range field for the in-flight data in the index table. The MSB bit of any SID field is generally set to 1, then cleared to "0" when the I/O transaction completes and is committed to the disk.

Other than the MSB, each bit in the SID field depicts the corresponding positional entity through which the data flows through. For example, the first bit in the SID field depicts the first entity in hierarchical structure. For example, the controller cache 111 may be the first entity through which the I/O data is stored/forwarded. The I/O buffers may be the second entity, etc. Every entity is generally aware of a positional bit in the SID field associated with the entity. The $m^{th}$ bit is generally set to 1 only by the $(m+1)^{th}$ entity. This may be line with an error detection flow using checksum. The data error from the previous entity is normally detected in the subsequent entity and may mark the next LSB bit to "1".

Example illustrations of multiple SID fields during an in-flight I/O for a 3 level hierarchical entities are shown below. A disk manager may be the last block in the flow. The cache control may be an intermediate entity. The I/O scheduler may be the initial block. An example of such a configuration is shown in the following TABLE 2:

TABLE 2

| Source of Corruption | MSB | 2 | 1 | 0 | Reason for Corruption |
|---|---|---|---|---|---|
| I/O Scheduler | 1 | 1 | 0 | 0 | CRC Check Failed after data crosses I/O Scheduler Block |
| Cache Control | 1 | 0 | 1 | 0 | CRC Check Failed after data crosses Cache Control Block |
| Disk Manager | 1 | 1 | 0 | 0 | CRC Check Failed after data crosses Disk Manager Block |
|  | 1 | 0 | 0 | 0 | In-flight data has no encountered errors, to be committed. |

An example of an SID field for in-flight data is shown in the following TABLE 3:

TABLE 3

| MSB | 0 | 1 | 2 |
|---|---|---|---|
| 0 | 1 | 0 | 0 |
| 0 | 0 | 1 | 0 |
| 0 | 0 | 0 | 1 |
| 1 | 0 | 0 | 0 |

The SID fields are preserved in for those I/O ranges that encountered an error. The SID fields are also preserved for those I/O ranges that did not complete the logical flow in entirety. For example, for the I/O transaction that was lost, the MSB bit may be stuck. A SID field entry with all bits set to 0 is not preserved.

The index table may be created and entries may be added whenever there is an I/O data flow through the array elements. The index table is generally created and/or held in a volatile memory. As an I/O transaction is completed, the entries are preserved into a non-volatile memory and/or discarded based on error condition. The index table may track the in-flight I/O requests and/or the SID fields associated with the I/O requests. A conceptual view of the index table is shown below. An example of a 3-level hierarchical structure within the array controller is shown in the following TABLE 4:

TABLE 4

| | SID field | | | |
|---|---|---|---|---|
| LUN/Disk/LBA range (LBA) | MSB | P1[1] | P1 | P1 P1 |
| 0x001/0x005/0x00004 ... 0x000000FFFF | 1 | 1 | 0 | 0 0 |
| 0x001/0x005/0x00005 ... 0xxxxxDFFF | 1 | 0 | 0 | 0 0 |
| 0x001/0x004/0x00004 ... 0x0000FED | 1 | 0 | 0 | 0 0 |

Paired entries of the in-flight I/O LBA ranges and/or SID fields are shown. As the data is moved through, an entry would have been created, the SID field would all be set to 0s and/or the MSB bit in the SID set to "1". If there is any data corruption occurrence for a particular I/O, the positional field in the SID field is set to "1". When the data is committed, an entry in the index table has a paired SID field set to "1 <any bit>". Such an entry is not discarded and/or the entry is preserved into a non-volatile memory. Until the particular I/O is committed, the entry in the table is preserved into non-volatile memory. Otherwise, the entry is discarded after the I/O has completed.

An example of a persistent index table is shown in the following TABLE 5:

TABLE 5

| LUN/Disk/LBA range (LBA) | SID field | | | | |
|---|---|---|---|---|---|
| | MSB | P1 | P1 | P1 | P1 |
| 0x001/0x005/0x00004 ... 0x000000FFFF1 | 0 | 1 | 0 | 0 | 0 |
| 0x001/0x005/0x00005 ... 0X0000DFFF | 1 | 0 | 0 | 0 | 0 |

An example of an entry flagging compromised data range is shown (e.g., entry flagging a lost I/O and/or truncated I/O flow). The size of persistent index table may be reduced since only entries for the compromised I/Os (e.g., the address range and the SID field) need to be stored. The preserved entries may be appended and/or altered to reflect newer I/O requests committed to the same marked I/O range. For example, the index table may have a persistent entry for a particular I/O range EF-FF. An SID field may also be set. A subsequent I/O request to the same range may be completed without any errors. The persistent entry flagging the error is invalid and the entry may need to be discarded from the index table.

Isolation of data corruption may be implemented using the source identifier bits. The index table may be persisted in a non-volatile memory for future look up by a data scrub process to assist in future data integrity analysis. An example application illustrating the necessity to preserve such bits may be described in the following scenarios.

Whenever data at rest is scrubbed by the host application (or a background process, or the raid process), the scrubbing may scan through the persisted index table containing the bits of the SID field. If any of the bits in the SID field are set, the data was compromised during the data commit process and has been flagged as a data in-flight corruption. A report of the corruption of the upper layers may be made. The SID bits structure may be used to determine the source of corruption. For example, if bit n was set to 1, then the relevant logical structure was the cause of corruption. Otherwise, if the MSB bit is set as mentioned in TABLE 4, the I/O transaction may be truncated. The last entity committing the data did not receive the I/O transaction and/or did not clear the MSB bit indicating a lost writes type of corruption.

In a different scenario, whenever the data at rest is scrubbed by the host application (or a background process) the process would detect a data corruption of the LBA data using the CRC/ECC protection scheme. However it is likely that there is not an index entry for this particular LBA (or range of LBAs). In such a scenario there was no data corruption while the data was in-flight. The data would have been silently corrupted at the storage device. While the system 100 may flag the source of the in-transit data corruption, the system 100 may also be used to assist in reporting silent data corruption as well.

A multi-level Data Scrub using SID field may be implemented. The SID bits not only allow flagging of the source of data corruption, but may also enable a faster and/or more efficient scrub of the data at the storage device level. Whenever the RAID/Data management layer performs a data scrub of the underlying data, the management layer would need to fetch the LBA data, qualify the data integrity using a inbuilt mechanism (e.g., DIF, etc.) and/or proceed to the next LBA. Using the system 100, whenever the management layer initiates the data scrub, a first level scrub through the persistent Index table structures may be preferred (e.g., the paired LEA/SID data). Once the walk through of the SID bits is complete, and a detection of these bits are set, the RAID layer may attempt recovery/correction/logging of these relevant LBAs. This would save lot of time in managing the data at store and may be defined to be performed in the background process. The system 100 may be used in addition to the traditional data protection methods (e.g., DIF, etc.).

The system 100 may use the source identifier and/or location marker technique to detect the source of data corruption while data in transit within a storage array or the underlying topology. Preserving and/or persisting any data corruption indicators may be used for future analysis to isolate the data corruption sources and/or to identify a source of data corruption. Data integrity checks may be applied to data in-transit over and beyond the checks provided by host interface protocols to asynchronously notify the host. Structural integrity techniques may be used to validate stored data in-buffers within a storage topology. A progressive CRC method may be used to detect the corruption of data in-transit and/or to apply a stage-wise unique CRC to the data in flow between different entities in a storage array topology. Bit identifiers may be used within the storage array to validate flow integrity of I/O transactions. Bit identifiers may be preserved in persistent memory to isolate lost I/O transactions of specific write operations.

The system 100 may flag the errors at an I/O granularity level. The system 100 may detect an error for an individual LBA that is compromised in a particular I/O range. The entire I/O range may be marked as containing possible compromised data. The range may be used an indicator. A firmware and/or data management layer may scan through the data during a store operation in media at an LBA granularity and/or differentiate the compromised data at the LBA granularity and/or make changes to the index table accordingly.

Creating the index table entries for each I/O request in transit places some performance overhead. However, the overhead may be mitigated by larger and/or more effective caching of host I/O data. If the index table itself is manipulated inadvertently, a flux situation where in the SID field indicates a data integrity failure may occur where no error has occurred. However, no damaging effect on the data will occur, since the host layer may still scrub the data at storage device level using the DIF field embedded and/or correct the improperly set bits in the SID field within the index table.

The system 100 may have direct application in an enterprise array with many hierarchical structures contained within them. Most of the array controllers manage plurality of data entities beneath them such as large caching structures, store and forward logic, backplane, drive trays. The system 100 may detect and/or flag issues during the data flow within such complex configurations. The system 100 may be scaled to meet larger configuration needs by extending the SID field definitions. The system 100 may be implemented using a variety of host interface protocols. The system 100 may flag the source of data corruption and/or classify/distinguish the kind of data corruption. The system 100 may inherently assist in distinguishing the type of data corruption by interpretation of the SID fields.

The functions performed by the diagram of FIG. 3 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   an array controller configured to read/write data to/from a drive array in response to one or more input/output requests;
   a frame buffer within said array controller configured to store said data prior to writing to said drive array, said array controller contains instructions configured to perform (i) a first data integrity check to determine a first type of data error and (ii) a second data integrity check to determine a second type of data error, wherein (i) said frame buffer logs occurrences of said first type of error and said second type of error in a field transmitted with said data and (ii) said field is used to determine a source of possible corruption of said data.

2. The apparatus according to claim 1, wherein said frame buffer is used to determine said source of possible corruption of said data after said data has been written to said drive array.

3. The apparatus according to claim 1, wherein said array controller comprises a Redundant Array of Inexpensive Drives (RAID) controller.

4. The apparatus according to claim 1, wherein said first data integrity check comprises a boundary check.

5. The apparatus according to claim 1, wherein said second data integrity check comprises a Cyclical Redundancy Check (CRC).

6. The apparatus according to claim 1, wherein said frame buffer flags said source of data corruption.

7. The apparatus according to claim 1, wherein said apparatus implements a boundary and structural check technique to verify if data delivered according to a protocol is compromised.

8. The apparatus according to claim 1, wherein said apparatus implements an asynchronous notification to a host layer if the data held in the frame buffer is corrupted.

9. The apparatus according to claim 1, wherein said apparatus implements a source identifier (SID) field configured to flag a source of data corruption during the process of writing data to the array.

10. The apparatus according to claim 1, wherein the index table containing SID fields is stored in a non-volatile storage for field analysis.

11. The apparatus according to claim 1, wherein one or more frames of data are time framed for each I/O request.

12. The apparatus according to claim 11, wherein said first data integrity check and said second data integrity check are implemented for each frame.

13. The apparatus according to claim 12, wherein a flag is set for each I/O transaction, which may represent each frame.

14. The apparatus according to claim 1, wherein said apparatus isolates different types of data corruption.

15. An apparatus comprising:
   means for reading/writing data to/from a drive array in response to one or more input/output requests;
   means for storing said data prior to writing to said drive array;
   means for performing (i) a first data integrity check to determine a first type of data error and (ii) a second data integrity check to determine a second type of data error, wherein (i) said frame buffer logs occurrences of said first type of error and said second type of error in a field transmitted with said data and (ii) said field is used to determine a source of possible corruption of said data.

16. A method for flagging a source of data corruption in a storage array comprising the steps of:
   reading/writing data to/from a drive array in response to one or more input/output requests;
   prior to storing said data in said drive array, performing (i) a first data integrity check to determine a first type of data error and (ii) a second data integrity check to determine a second type of data error, wherein (i) said frame buffer logs occurrences of said first type of error and said second type of error in a field transmitted with said data and (ii) said field is used to determine a source of possible corruption of said data.

\* \* \* \* \*